Sept. 5, 1939.  P. B. HARWOOD  2,172,245
DYNAMIC BRAKING CONTROLLER
Filed July 30, 1937   3 Sheets-Sheet 1

Inventor
Paisley B. Harwood
By Frank Hubbard
Attorney

Patented Sept. 5, 1939

2,172,245

UNITED STATES PATENT OFFICE 2,172,245

DYNAMIC BRAKING CONTROLLER

Paisley B. Harwood, Milwaukee, Wis., assignor to Cutler-Hammer, Inc., Milwaukee, Wis., a corporation of Delaware Application July 30, 1937, Serial No. 156,478

12 Claims. (Cl. 172—179)

This invention relates to improvements in dynamic braking controllers for electric motors.

In the patent of Wilson et al., No. 1,985,706, granted December 25, 1934, is disclosed a controller to effect reverse power operations of a pair of series motors and to render both motors effective for dynamic braking when overhauled in either direction, such controller establishing for dynamic braking two closed loops each including the field winding of one motor and the armature of the other motor, and the present invention relates to improvements in dynamic braking controllers of such type.

An object of the present invention is to provide a controller of the aforesaid type which will be better suited to motors subjected to wide variations in speed.

More specifically it is an object of the invention to provide regulating means for adjusting the resistance of the dynamic braking loops according to the speed of the motors for proper braking of the motors following power operation at different speeds or following drifting of the motors.

Another object is to provide regulating means of the character stated which under certain conditions will function automatically to vary the resistance of the dynamic braking loops.

Another object is to provide regulating means for the dynamic braking loops which in addition to functioning as aforestated will properly regulate the resistance of the loops, assuming power failure while the motors are operating on power.

Other objects and advantages of the invention will hereinafter appear.

Certain embodiments of the invention are disclosed in the accompanying drawings which will now be described, it being understood that the invention is capable of embodiment in other forms without departing from the scope of the appended claims.

Figure 1:
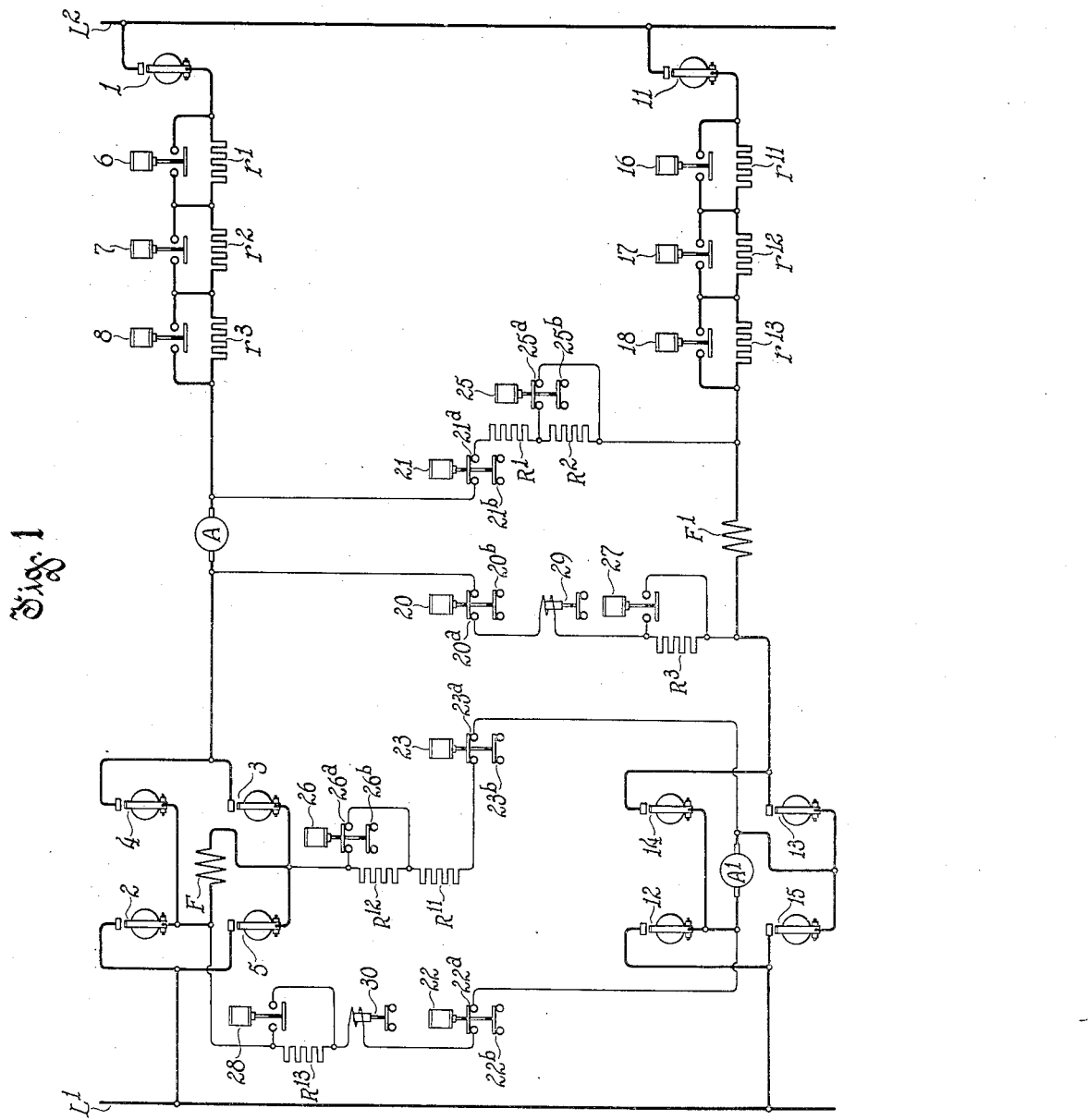
Figure 1 shows diagrammatically the power circuits of a system like that shown in the aforementioned Wilson et al. patent supplemented with means to accomplish the objects aforestated.
Figure 2:
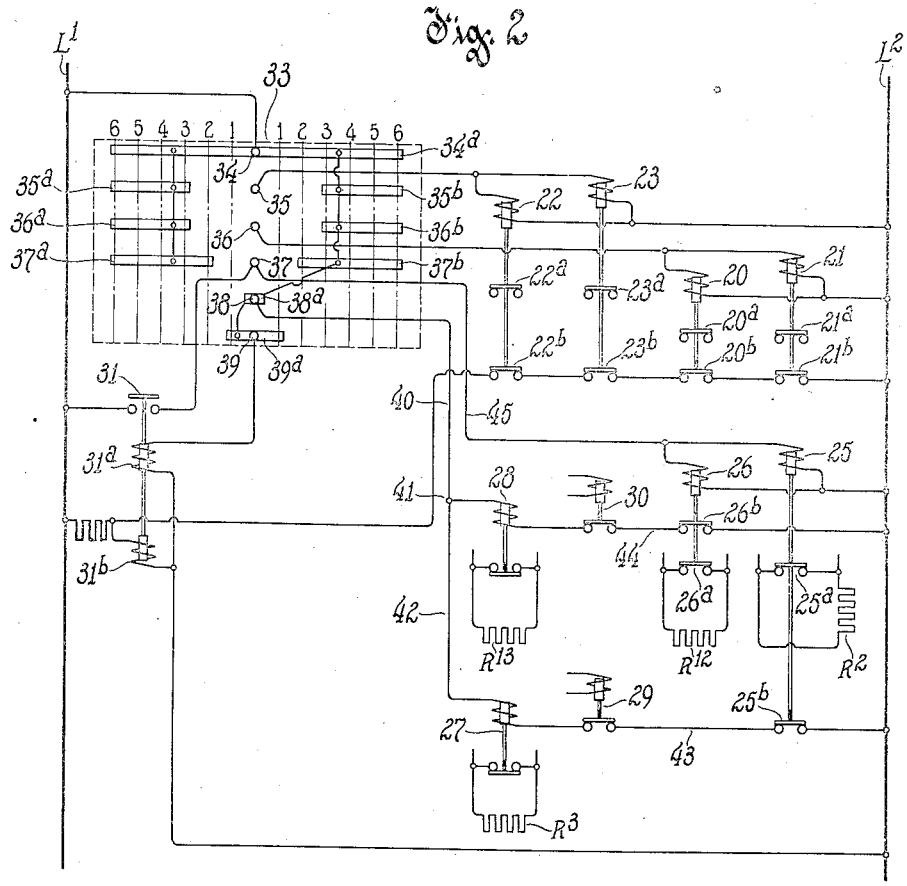
Fig. 2 shows diagrammatically control circuits for the dynamic braking elements of Fig. 1 and a drum type master controller therefor which may form a section of a single master controller for both power and dynamic braking control.
Figure 4:
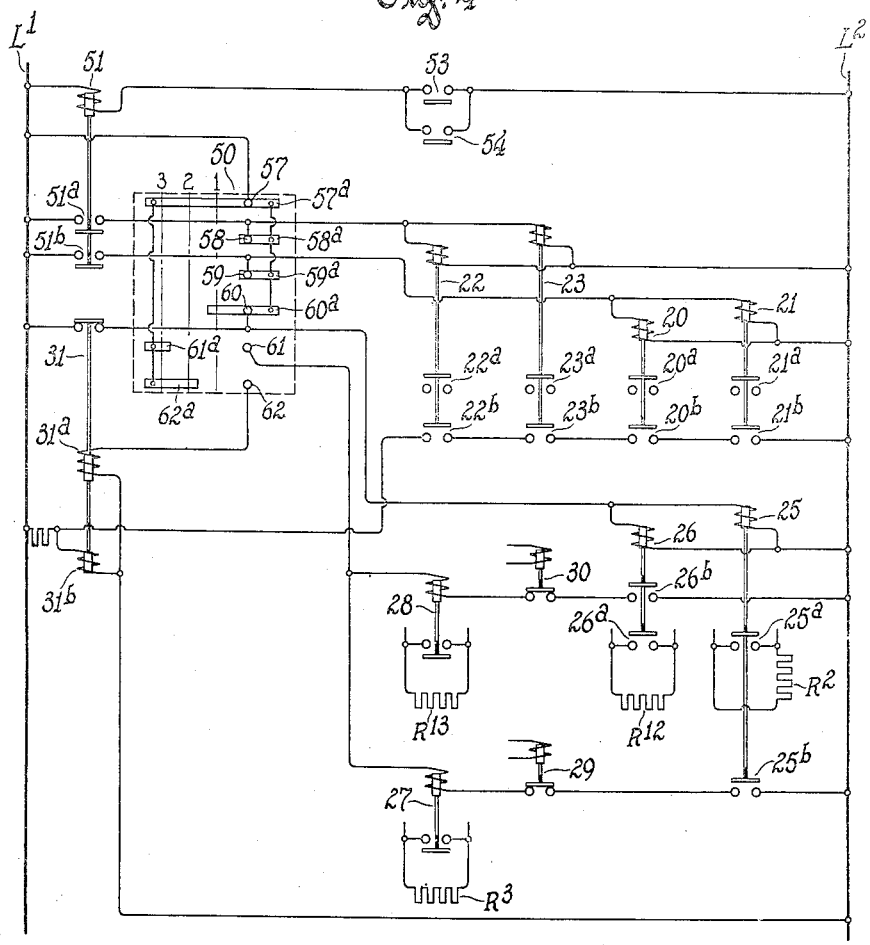
Figure 5:
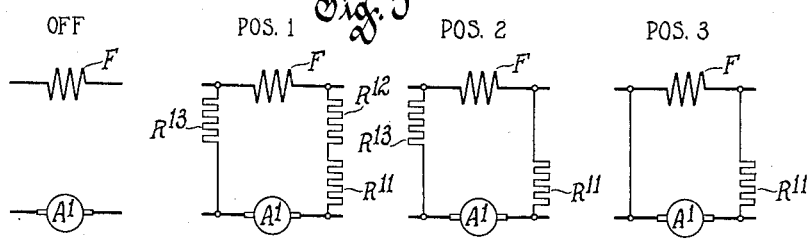

Fig. 4 shows diagrammatically control circuits for the dynamic braking elements of Fig. 1 and a foot operated controller therefor separate from the power master, such foot operated controller serving in lieu of the controller shown in Fig. 2, and Fig. 5 shows the several circuit commutations afforded by the foot operated controller of Fig. 4 for the field winding of one motor and the armature of the other motor.

Referring to Fig. 1, the same is like Fig. 1 of the aforementioned Wilson et al. patent in the following respects. A motor comprising an armature A and a series field winding F is arranged to be connected across lines $L^1$ and $L^2$ by an electroresponsive main switch 1, and electroresponsive reversing switches 2, 3, 4 and 5 through resistances $r^1$, $r^2$ and $r^3$, said resistances being respectively provided with electroresponsive control switches 6, 7 and 8. A second motor having an armature $A^1$ and a series field winding $F^1$ is arranged to be connected across lines $L^1$ and $L^2$ by an electroresponsive main switch 11 and electroresponsive reversing switches 12, 13, 14 and 15 through resistances $r^{11}$, $r^{12}$ and $r^{13}$, respectively provided with electroresponsive controlling switches 16, 17 and 18. It is of course to be understood that the control means may include any desired amount of resistance to provide for acceleration and speed regulation of the motors. It is herein assumed that the resistances shown provide for speed regulation to afford selectively a normal speed, high speed and half speed.

Also Fig. 1 is like Fig. 1 of the aforementioned Wilson et al. patent in the provision of normally closed electroresponsive switches 20, 21, 22 and 23 which complete the dynamic braking loops. Thus the switch 20 when closed connects the left hand terminal of armature A to the left hand terminal of field winding $F^1$ while switch 21 when closed connects the right hand terminal of field winding $F^1$ to the right hand terminal of armature A. Similarly switch 22 when closed connects the left hand terminal of armature $A^1$ to the left hand terminal of field winding F, while switch 23 when closed connects the right hand terminal of field winding F to the right hand terminal of armature $A^1$. These loops like the loops of the Wilson et al. disclosure contain fixed resistances but they also have commutatable resistances.

In this instance the dynamic braking loop of the armature A and field winding $F^1$ has a fixed resistance $R^1$ and resistances $R^2$ and $R^3$ which may be excluded from circuit while the loop for the armature $A^1$ and field winding F has similar resistances $R^{11}$, $R^{12}$ and $R^{13}$. The resistances $R^2$ and $R^{12}$ are respectively provided with short-circuiting switches 25 and 26, each of said switches being electromagnetic and of the normally closed type. The resistances $R^3$ and $R^{13}$ are respectively provided with short-circuiting switches 27 and 28, each of said switches being electromagnetic and of the normally open type. For control of certain of these resistance switches, current relays 29 and 30 are provided, each of said relays being of the normally closed type. The winding of relay 29 is in series with the armature A and field winding $F^1$, while the winding of relay 30 is in series with the armature $A^1$ and field winding F.

Referring to Fig. 2, the same shows the aforementioned resistances for the dynamic braking loops and the aforementioned switches and relays for establishing and regulating the braking loops. The switches 25 and 26 are respectively shown with main contacts 25ª and 26ª to control their respective resistances, and with auxiliary contacts 25ᵇ and 26ᵇ, respectively, for a purpose hereinafter set forth. The switches, 20, 21, 22 and 23 are shown as respectively provided with main contacts 20ª, 21ª, 22ª and 23ª which control the continuity of the braking loops as aforestated, and with auxiliary contacts 20ᵇ, 21ᵇ, 22ᵇ and 23ᵇ, respectively for a purpose hereinafter set forth.

Also in Fig. 2 is shown an additional electromagnetic switch 31 of the normally closed type having an operating winding 31ª to move it to open position, and a restraining winding 31ᵇ which when energized holds said switch against opening by the winding 31ª.

All of the electroresponsive switches shown in Fig. 2 except the current relays 29 and 30 are under the control of a master controller 33 of the drum type. The master controller 33 as heretofore set forth may constitute a section of a single drum controller for controlling both power and dynamic braking connections, such controller being movable in opposite directions from a central position to effect reverse operations of the motor selectivity, and being returnable towards central position to effect dynamic braking. The dynamic braking section 33 comprises contact fingers 34, 35, 36, 37, 38 and 39. The contact finger 34 has a cooperating contact segment 34ª which remains in engagement therewith in all positions of the combined power and dynamic braking controller, it being assumed that said controller has an off position and six operative positions on opposite sides of the off position, the first three positions being for dynamic braking control. The contact finger 38 has a cooperating segment 38ª which engages the same in the off position of the controller and which leaves it as the controller moves into either of its first operative positions. The contact finger 39 has a cooperating contact segment 39ª which engages it in the off position of the controller and which disengages it as the controller moves to either of its second operative positions. The contact finger 37 has cooperating segments 37ª and 37ᵇ, one of which engages said finger when the controller is moved into either of its second operative positions. The contact finger 36 has cooperating segments 36ª and 36ᵇ, one of which engages said finger as the controller moves into either of its third operative positions, and contact finger 35 has cooperating segments 35ª and 35ᵇ which engage said finger 35 upon the same movement of the controller. The segments 35ª, 36ª and 37ª after engaging their respective fingers remain in engagement therewith throughout further movement of the controller in the same direction, and similarly the segments 35ᵇ, 36ᵇ and 37ᵇ after engaging their respective fingers remain in engagement therewith upon further movement of the controller in the same direction.

Figure 3:
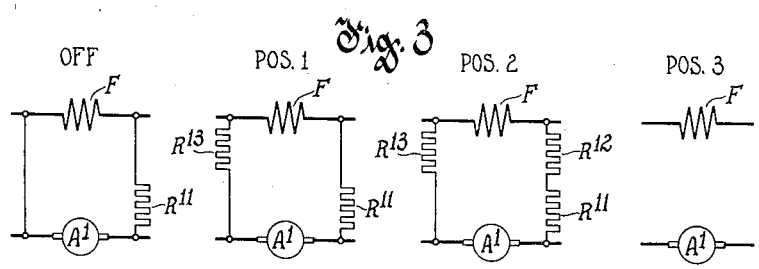
Fig. 3 shows the several circuit commutations afforded by the master controller of Fig. 2 for the field winding of one motor and the armature of the other motor.

In Fig. 2 the master controller is shown in the off position and the electroresponsive switches and relays are shown in the positions which they occupy, assuming the motors to be at rest. Thus the switch 31 which is biased to closed position is opened because its operating winding 31ª is energized while its restraining winding 31ᵇ is short-circuited by the auxiliary contacts 20ᵇ to 23ᵇ of the normally closed dynamic braking switches 20 to 23, respectively. Switch 31 if closed would energize the resistance switches 25 and 26 independently of the master controller, but being open the switches 25 and 26 which are biased to closed position thus short-circuit resistances $R^2$ and $R^{12}$. Moreover resistance switches 25 and 26 being in closed position energize through the medium of their auxiliary contacts 25ᵇ and 26ᵇ, respectively, the windings of resistance switches 27 and 28. Circuit for the windings of switches 27 and 28 may be traced from line $L^1$ to contact finger 34, through inter-connected segments 34ª and 38ª to finger 38, by conductor 40 to a point 41 where the circuit divides; one branch extending from point 41 by conductor 42 through the winding of switch 27, through the contacts of current relay 29, by conductor 43, through the auxiliary contacts 25ᵇ of resistance switch 25 to line $L^2$, and the other branch extending through the winding of switch 28 and the contacts of relay 30, by conductor 44 through the auxiliary contacts 26ᵇ of resistance switch 26 to line $L^2$. As a consequence the switches 27 and 28 occupy closed positions, thereby short-circuiting resistances $R^3$ and $R^{13}$. Accordingly in off position each braking loop is as shown in Fig. 3 under the heading of "Off". The loop here shown is that of field winding F and armature $A^1$, and as shown the loop includes only the fixed resistance $R^{11}$.

When the controller is moved one step in either direction the segment 39ª disengages contact finger 39, thereby deenergizing the windings of resistance switches 27 and 28.

Accordingly the resistance $R^{13}$ will be included in the loop of field winding F and armature $A^1$ as shown in Fig. 3 under the heading "Pos. 1", whereas the resistance $R^3$ will be included in the second loop.

When the master controller is moved to either of its second operative positions circuit will be closed from line $L^1$ to contact finger 34 through the interconnected contact fingers, to contact finger 37, by conductor 45, through the windings of switches 25 and 26 in parallel to Line $L^2$. Accordingly switches 25 and 26 will respond to open the short-circuits around resistances $R^2$ and $R^{12}$. This will include resistance $R^{12}$ in the loop of field winding F and armature $A^1$ in addition to resistances $R^{11}$ and $R^{13}$, as shown in Fig. 3 under the heading of "Pos. 2", and similarly the loop of field winding $F^1$ and armature A will be commutated to include all three resistances. Furthermore when the controller is moved to position 2 the drum segment 39ª is disengaged from the finger 39, thereby deenergizing winding 31ª and allowing switch 31 to reclose, thus maintaining the resistance switches 25 and 26 energized independently of the controller for a purpose hereinafter set forth.

When the master controller is moved to its third operative position the resistance controlling switches remain as described, whereas switches 20, 21, 22 and 23 are energized to open and thus interrupt the dynamic braking loops, as indicated in Fig. 3 under the heading "Pos. 3". As will be apparent, circuit is closed from line $L^1$ to contact 34 through interconnected drum segments to contact 35, to and through the windings of switches 22 and 23 in parallel to line $L^2$, while a second circuit is completed from contact 34 through interconnected drum segments to contact 36, and thence to and through the windings of switches 20 and 21 in parallel to line $L^2$. Upon energization of switches 20 to 23 their auxiliary contacts $20^b$ to $23^b$ are disengaged whereby the restraining winding $31^b$ of switch 31 is thrown directly across lines $L^1$ and $L^2$.

As will be understood, the connections established in position 2 are those proposed for dynamic braking of the motors when operating at high speed while the connections established in position 1 are those proposed for dynamic braking when the motors are operating at normal speed, the connections established in the off position being proposed for braking of the motors when operating at half speed. Thus the controller makes possible the selection of different braking connections at will to suit the speed of the motors, whereas the controller maintains dynamic braking connections after stopping of the motors.

Additionally the controller provides certain automatic regulation. First: assuming that the motors are operating at maximum speed and the master controller is moved through second position towards the off position, the switches 20 to 23 will drop to complete the braking loops with all resistance included, and whereas the master controller tends to deenergize the resistance switches 25 and 26 to short-circuit a resistance in each loop said switches are maintained energized for a temporary period by the switch 31 which as aforedescribed closes upon movement of the master controller in either direction from first position to second position. On the other hand, as the master controller returns to its first position the operating winding of switch 31 will be energized to open said switch for deenergization of resistance switches 25 and 26, but such action will be delayed for a temporary period by the self-inductive action of the winding $31^b$ which now is short-circuited by the auxiliary contacts of switches 20 to 23. Thus after lapse of a time in which the motors have an opportunity to slow down the switches 25 and 26 will close to exclude one resistance from each loop. This graduation of dynamic braking is effected even assuming return of the master controller to off position. Second: if the master controller is thrown from a running position to off position and the dynamic braking current exceeds that at which the relays 29 and 30 are designed to respond further automatic graduation will be obtained. When the controller is returned to off position it of course tends to energize the now open resistance switches 27 and 28, but if the relays 29 and 30 have responded they must close before switches 27 and 28 can close. Upon closure of the switches 27 and 28 subject to such delay they will short-circuit another resistance from each braking loop, leaving in each loop only the fixed resistance. However, should the dynamic braking thereafter exceed the value at which relays 29 and 30 are set to respond said relays will respond to reinsert resistances $R^3$ and $R^{13}$ pending reduction of the dynamic current, so acting repeatedly if necessary to maintain the braking current within the predetermined limit.

Upon failure of power while the motors are operating on power switches 20 to 23 release to establish dynamic braking connections and resistance switches 25 and 26 likewise release to exclude one resistance from each loop. The switches 27 and 28 cannot respond because of the failure of power, and thus each braking loop has two resistances which may be designed without interfering with their aforestated purposes, to limit the braking current sufficiently even though the motors are operating at maximum speed when power fails. Of course when power is restored and the dynamic braking current is within a limit such that the relays 29 and 30 close, switches 27 and 28 will respond to leave each loop with only its fixed resistance included.

Referring to Fig. 4, the same shows electroresponsive elements for dynamic braking which are like those shown in Fig. 2 and which are accordingly here given like reference numerals. In this instance, however, such electroresponsive elements are controlled by a foot operated switch 50 which is separate from the controller effecting running and speed regulation of the motors. Also Fig. 4 shows an additional electroresponsive relay 51 having its operating winding connected across lines $L^1$ and $L^2$ through contacts 53 and 54 to be associated with and engaged by certain of the reversing switches shown in Fig. 1. It may be assumed that contacts 53 are associated with reversing switch 2 to be engaged upon closure of said switch and that contacts 54 are associated with reversing switch 4 to be engaged upon closure of said switch 4. Thus relay 51 will close whenever the motors are operating on power and will open when the motors are disconnected from the lines, said relay having contacts $51^a$ and $51^b$.

The foot operated switch comprises contact fingers 57, 58, 59, 60, 61 and 62 and contact segments $57^a$, $58^a$, $59^a$, $60^a$, $61^a$ and $62^a$. The foot operated switch is shown in off position and in such position the segments $57^a$ to $60^a$ all engage their respective contact fingers while segments $61^a$ and $62^a$ are out of engagement with their respective contact fingers. When the switch is moved to its first operative position segments $58^a$ and $59^a$ disengage contact fingers 58 and 59 while in the second operative position segment $60^a$ disengages contact finger 60, whereas segment $62^a$ moves into engagement with contact finger 62. In the third operative position segment $61^a$ moves into engagement with contact finger 61.

With the foot operated switch in off position as shown circuit is completed from line $L^1$ to contact finger 57 through interconnected segments $57^a$ and $58^a$ to contact finger 58 and thence through the windings of switches 22 and 23 in parallel to line $L^2$. Also circuit is established from contact finger 57 through interconnected segments $57^a$ and $59^a$ to contact 59 and thence through the windings of switches 20 and 21 in parallel to line $L^2$. Accordingly in off position of the switch 50 the dynamic braking connections are interrupted as indicated in Fig. 5 under the heading "Off", permitting the motors to be operated on power as desired. Of course if desired the switch 50 might be designed to maintain braking connections with the motors at rest as does the controller of Fig. 2, but frequently users desire provision whereby the motors may optionally be operated and then stopped by plugging only, and in such instances interruption of the braking connections by the switch 50 when in off position is desirable. Also in off position the switches 27 and 28 are deenergized and stand in open position to interrupt the short-circuits of resistances $R^3$ and $R^{13}$, respectively. On the other hand, switches 25 and 26 are energized and stand in open position to interrupt the short-circuits of resistances $R^2$ and $R^{12}$ respectively, the windings of switches 25 and 26 being connected in parallel across lines $L^1$ and $L^2$ by the switch 50 and independently of the switch 50 by the now closed relay 31.

When the switch 50 is moved one step it effects completion of both dynamic braking loops each inclusive of its fixed and commutatable resistances, the loop for armature $A^1$ and field winding $F$ thus being as shown in Fig. 5 under the heading "Pos. 1". Such movement of the switch 50 disengages segments $58^a$ and $59^a$ from contacts 58 and 59, thereby deenergizing switches 20 to 23 for closure to complete the dynamic braking loops. This is assuming the motors to be disconnected from the supply lines, for otherwise relay 51 would be energized and its contacts $51^a$ and $51^b$ would be closed to maintain the energizing circuits of switches 20 to 23, said contacts $51^a$ and $51^b$ connecting the windings of switches 20 to 23 in pairs directly to line $L^1$. The resistances $R^3$ and $R^{13}$ are included in their respective loops because the switches 27 and 28 remain deenergized while the resistances $R^2$ and $R^{12}$ are included in their respective loops because the switches 25 and 26 remain energized.

When the switch 50 is moved a second step it effects exclusion from the loops of resistances $R^2$ and $R^{12}$, respectively, whereby each loop will include only two resistances as shown in Fig. 5 under the heading of "Pos. 2". The switch 50 in moving to its second position effects exclusion of resistances $R^2$ and $R^{12}$ by deenergizing switches 25 and 26 through disengagement of segment $60^a$ from contact finger 60. This is assuming that relay 31 has in the meantime responded to open the line connection for the operating windings of switches 25 and 27 paralleling the switch 50. Also in the second position of switch 50 the segment $62^a$ engages contact 62 to connect across the line the operating winding $31^a$ of relay 31 causing said relay to respond subject only to the delay provided by the then short-circuited restraining winding $31^b$.

When the switch 50 is moved a third step it effects exclusion from the loops of resistances $R^3$ and $R^{13}$, respectively, whereby each loop will include only the fixed resistance as shown in Fig. 5 under the heading "Pos. 3." The switch 50 in moving to its third position engages segment $61^a$ with contact finger 61, thereby connecting across lines $L^1$ and $L^2$ the operating windings of resistance switch 27 and 28 in parallel. Accordingly switches 27 and 28 are rendered operative to short-circuit resistances $R^3$ and $R^{13}$ respectively.

As will be understood, graduation of the resistance automatically in the manner described in connection with Fig. 2 will be accomplished also with the arrangement of Fig. 4. Also dynamic braking on failure of power is provided for since failure of power will release switches 20 to 23, causing them to close the dynamic braking loops. While failure of power will deenergize resistance switches 25 and 26 to short-circuit resistances $R^2$ and $R^{12}$, resistance switches 27 and 28 will be open to effect inclusion of resistances $R^3$ and $R^{13}$ in the braking loops respectively whereby each loop will include two resistances as in the system of Fig. 2.

What I claim as new and desire to secure by Letters Patent is:

1. In a controller for a plurality of series wound motors, in combination, means to establish dynamic braking connections comprising separate closed loops each including the armature of one motor and the field winding of another motor, like resistances for said loops, and means for varying in a like manner the resistances of said loops to suit the speed of the motors, the last mentioned means including means affording under given operating conditions automatic control of certain of such resistance variations.

2. In a controller for a plurality of series wound motors, in combination, means to establish dynamic braking connections comprising separate closed loops each including the armature of one motor and the field winding of another motor, like resistances for said loops including fixed resistance and variable resistance, and means for varying in a like manner the variable resistances of said loops to suit the speed of said motors, the last mentioned means including means rendering variation of said resistance subject to predetermined delay.

3. In a controller for a plurality of series wound motors, in combination, means to establish dynamic braking connections comprising separate closed loops each including the armature of one motor and the field winding of another motor, like resistances for said loops including fixed resistance and variable resistance, said means effecting establishment of said loops upon failure of power, and means for varying in a like manner the resistances of said loops, the last mentioned means including means insuring upon establishment of said loops resulting from power failure inclusion of a part of the variable resistance of each loop and exclusion of a part of said resistance.

4. In a controller for a plurality of series wound motors, in combination, means to establish dynamic braking connections for the motors comprising separate closed loops each including the armature of one motor and the field winding of another motor, said means effecting establishment of said loops upon failure of power, like resistances for said loops including fixed resistance and variable resistance, and means for varying in a like manner the variable resistances of the loops in steps, the last mentioned means including electromagnetic resistance switches certain of which upon failure of power include their respective resistances and certain of which upon failure of power exclude their respective switches.

5. In a controller for a plurality of series wound motors, in combination, means to establish dynamic braking connections for the motors comprising separate closed loops each including the armature of one motor and the field winding of another motor, said means effecting establishment of said loops upon failure of power, like resistances for said loops including fixed resistance and variable resistance, means for varying in a like manner the variable resistances of the loops in steps, the last mentioned means including electromagnetic resistance switches certain of which upon failure of power include their respective resistances and certain of which upon failure of power exclude their respective resistances, and automatic control means for said electromagnetic switches delaying under certain operating conditions their operation to exclude resistance.

6. In a controller for a plurality of series wound motors, in combination, means to establish dynamic braking connections comprising separate closed loops each including the armature of one motor and the field winding of another motor, like resistances for said loops comprising fixed resistance and variable resistance, and means for varying in a like manner the resistances of said loops, the last mentioned means including means to select any one of a number of gradations of said variable resistance and also including means to render the completion of the selected gradation of resistance subject to delay, the time element incident to completion of such gradation being under certain operating conditions not prolonged by the last mentioned means.

7. In a controller for a plurality of series wound motors, in combination, means to establish dynamic braking connections comprising separate loops each including the armature of one motor and the field winding of another motor, like resistances for said loops including a fixed resistance and at least two steps of commutatable resistance, and means for varying in a like manner the resistances of said loops, said means including electromagnetic switches certain of which when deenergized include their respective resistances, and certain of which require energization to include their respective resistances, means effective except on power failure to render operation of the latter of said switches to exclude resistance subject to a predetermined minimum time delay, and means rendering response of the former of said switches to exclude resistance subject to control by the value of the dynamic braking current.

8. In a controller for a plurality of series wound motors, in combination, means to establish dynamic braking connections for the motors comprising separate closed loops each including the armature of one motor and the field winding of another motor, said means effecting establishment of said loops upon failure of power, like resistances for said loops comprising fixed resistance and commutatable resistance, means for varying in a like manner the commutatable resistances of said loops, the last mentioned means including electromagnetic switches certain of which require energization for exclusion thereby of their respective resistances, and certain of which when deenergized exclude their respective resistances, means associated with the former of said switches to render response thereof controllable by the value of the dynamic braking current, and means associated with the latter of said switches subjecting the same except upon failure of power to control insuring at least a given minimum delay in operation thereof to exclude resistance.

9. In a controller for a plurality of series wound motors, in combination, means to establish dynamic braking connections comprising separate closed loops each including the armature of one motor and the field winding of another motor, like resistances for said loops including fixed resistance and variable resistance, and means for varying in a like manner the variable resistances of said loops, the last mentioned means including electromagnetic switches for effecting resistance commutations, certain of said switches when deenergized excluding the resistance controlled thereby, manual means controlling said electromagnetic switches, and a time element device controlled jointly by said manual means and the first mentioned means to influence the operation of said switches requiring deenergization for exclusion of resistance.

10. In a controller for a plurality of series wound motors, in combination, means to establish dynamic braking connections comprising separate closed loops each including the armature of one motor and the field winding of another motor, said means completing said loops upon motor, failure of power, a manual device controlling said means for establishment and interruption of said loops at will, like resistances for said loops including fixed resistance and variable resistance, means under the control of said manual device to vary said variable resistance, and means subjecting the last mentioned means under certain operating conditions to delayed action in response to said manual device.

11. In a controller for a plurality of series wound motors, in combination, means to establish dynamic braking connections comprising closed loops each including the armature of one motor and the field winding of another motor, said means establishing said loops upon failure of power, a manual device controlling said means to effect establishment and interruption of said loops at will, like resistances for said loops including fixed resistance and variable resistance, and electromagnetic switches controllable by said manual device to vary said variable resistances in a like manner, certain of said switches when deenergized excluding the resistance controlled thereby and certain of said switches requiring energization to exclude the resistance controlled thereby.

12. In a controller for a plurality of series wound motors, in combination, means to establish dynamic braking connections comprising closed loops each including the armature of one motor and the field winding of another motor, said means establishing said loops upon failure of power, a manual device controlling said means to effect establishment and interruption of said loops at will, like resistances for said loops including fixed resistance and variable resistance, electromagnetic switches controllable by said manual device to vary said variable resistances in a like manner, certain of said switches when deenergized excluding the resistance controlled thereby and certain of said switches requiring energization to exclude the resistance controlled thereby, means responsive to the braking current when above a predetermined value to delay energization of the latter of said switches, and a time element device controlled jointly by said manual device and the first mentioned means to subject the former of said switches to a time element incident to operation thereof.

PAISLEY B. HARWOOD.